Dec. 19, 1933.    J. C. McCUNE    1,939,910
BRAKE APPLICATION AND RELEASE VALVE DEVICE
Filed Aug. 22, 1930
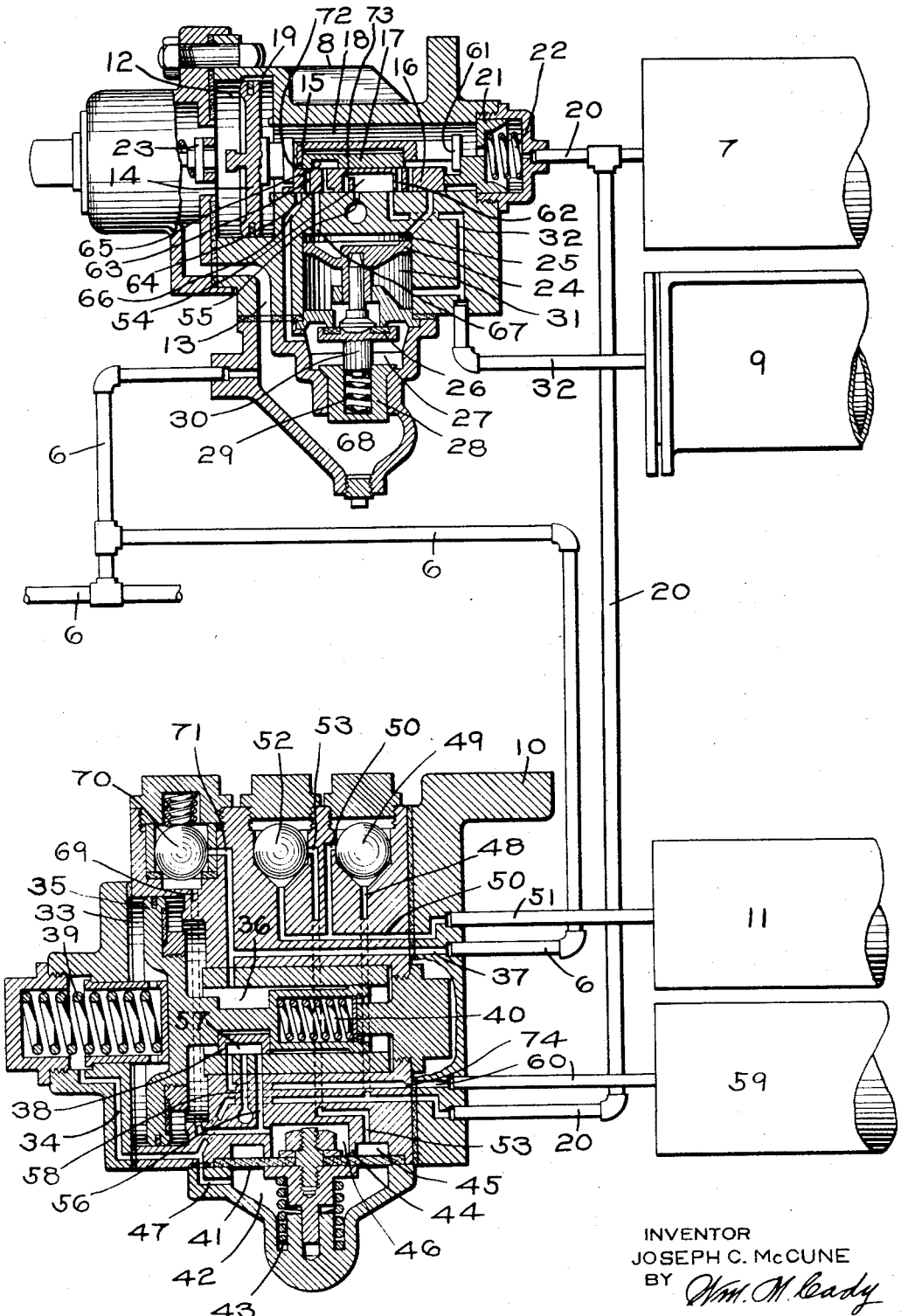
INVENTOR
JOSEPH C. McCUNE
BY *Wm. M. Cady*
ATTORNEY Patented Dec. 19, 1933

1,939,910

UNITED STATES PATENT OFFICE 1,939,910

BRAKE APPLICATION AND RELEASE VALVE DEVICE

Joseph C. McCune, Edgewood, Pa., assignor to The Westinghouse Air Brake Company, Wilmerding, Pa., a corporation of Pennsylvania Application August 22, 1930. Serial No. 477,076

12 Claims. (Cl. 303—35)

This invention relates to fluid pressure brakes, and more particularly to brake equipment in which the brakes are applied by effecting a reduction in brake pipe pressure and are released by increasing the brake pipe pressure.

On long trains, it is difficult to apply and release the brakes without causing excessive shocks, due to the running in of the slack before the brakes are applied on the rear cars of the train and the running out of the slack before the brakes are released on the rear cars.

In actual service, difficulty is encountered in causing all brakes to apply on long trains because of the slow rate of brake pipe reduction, due to the auxiliary reservoirs of the brake equipments discharging fluid into the brake pipe through the feed grooves, so that excessively heavy reductions in brake pipe pressure must be made to insure that all brakes will apply, especially when brake pipe leakage is of a minimum amount. Consequently, shocks are encountered not only because of the slow serial application of the brakes, but also because they apply non-uniformly in degree of braking force. Furthermore, difficulty in releasing the brakes is experienced, because the brake pipe pressure, when restored entirely from the locomotive, increases so slowly that leakage past the triple valve packing rings causes equalization of pressure on the triple valve pistons and a resultant failure of the brakes to release.

The principal object of my invention is to provide a brake equipment by which the brakes can be applied and released on a long train with certainty and without causing excessive shocks.

According to one feature of my invention, the venting of fluid from the brake pipe to effect quick serial action (commonly known as quick service) in a service application of the brakes, is controlled by a valve device separate from the triple valve device, and subject to the opposing pressures of the auxiliary reservoir and the brake pipe and adapted to respond to a differential of pressures less than the differential required to move the main slide valve of the triple valve device to application position.

According to my invention, the valve device for causing quick service is controlled by the operation of the triple valve device in venting fluid from the auxiliary reservoir to the brake cylinder, so that the quick service valve device is moved to lap position when the auxiliary reservoir pressure is reduced toward approximate equality with the brake pipe by operation of the triple valve device, and this permits the use of a relatively large port and through which fluid is vented from the brake pipe, so that a large quantity of fluid from the brake pipe can quickly pass through it, since the degree of local reduction in brake pipe pressure is limited to that approximately necessary to cause the triple valve device to apply the brakes, and an over reduction in brake pipe pressure is prevented, as would be the case with the usual triple valve device, were a large quick service port to be employed.

With my improved apparatus, the reservoir into which fluid is vented from the brake pipe in effecting quick service, is of large volume, so that there will be provided a large difference in pressure between the brake pipe pressure and the pressure in the reservoir to ensure continuous and rapid venting as long as the valve device remains in the venting position. With a reservoir of small volume, the pressure tends to quickly equalize with that in the brake pipe, so that the venting capacity is soon lost. A large capacity reservoir may be used with my improved apparatus, because the quick service drop in brake pipe pressure is not dependent upon the volume of the reservoir, as is the case with the usual quick service reservoir.

A spring is employed to cause the quick and positive movement of the quick service valve device to lap position, so as to prevent an over reduction in brake pipe pressure due to the large area quick service port and the large volume reduction reservoir. The spring operates to quickly lap the valve device as the brake pipe and auxiliary reservoir pressures approach equalization.

The quick service valve device moves with a minimum of frictional resistance, so that the differential of fluid pressures required to move the valve device may be fixed by springs.

According to my invention, the release is accelerated serially throughout the train, by venting fluid from a normally charged reservoir on each vehicle to the brake pipe, the accelerated release being also controlled by the quick service valve device.

Other objects and advantages will appear in the following more detailed description of the invention.

In the accompanying drawing, the single figure is a diagrammatic view, mostly in section, of a fluid pressure brake equipment embodying the invention.

Referring to the drawing, the equipment may comprise a brake pipe 6, auxiliary reservoir 7, triple valve device 8, brake cylinder 9, quick service valve device 10, and serial release reservoir 11.

The triple valve device 8 may be of well known construction and comprises a casing having a chamber 12 connected to the brake pipe 6, through a passage 13 and containing a piston 14 having a stem 15 adapted to operatively engage a main slide valve 16 and an auxiliary slide valve 17 contained in a chamber 18 connected to the piston chamber 12 through the usual feed groove 19 around the piston 14 and also connected to the auxiliary reservoir 7 through a pipe 20. Also contained in the valve chamber 18 is a retarded release stop 21 which is subject to the pressure of a spring 22 and which is adapted to be engaged by the end of the piston stem 15. Contained in the piston chamber 12 is the usual spring-pressed graduation stem 23 with which the piston 14 is adapted to engage.

The triple valve device 8 also comprises a quick action piston 24 contained in a chamber 25 and adapted to operate a quick action valve 26 contained in a chamber 27. Also contained in the chamber 27, is a check valve 28 having a central bore containing a spring 29 with which a projection 30, on the valve 26, cooperates. The chamber 31 at one side of the quick action piston 24 is connected to the brake cylinder 9, through a passage and pipe 32. Passage 32 also leads to the seat of the main slide valve 16.

The quick service valve device 10 may comprise a casing having a piston chamber 33, connected through a passage 34 with the auxiliary reservoir pipe 20 and containing a piston 35 and having a valve chamber 36, connected through a passage 37 with the brake pipe 6 and containing a slide valve 38, adapted to be operated by piston 35.

On one side of the piston 35 there is a spring stop 39, while on the opposite side of said piston there is a spring stop 40, which is mounted in the valve chamber 36 and engages the end of the piston stem. The construction is such that when the device is in release position, as shown in the drawing, the piston 35 is held between the springs stops 39 and 40, and movement of the piston in either direction is opposed thereby.

Also mounted in the casing of the quick service valve device 10, is a flexible diaphragm 41, having at one side a chamber 42 containing a spring 43 which urges said diaphragm into engagement with a seat rib 44 at the opposite side of the diaphragm, said seat rib separating an annular chamber 45 from a chamber 46 when the diaphragm is seated.

In operation, when the brake pipe 6 is charged with fluid under pressure in the usual manner, fluid flows from the brake pipe through passage 13 to piston chamber 12 of the triple valve device 8 and shifts the piston 14 to release position, as shown in the drawing.

Fluid then flows from the piston chamber 12, through the feed groove 19 to valve chamber 18, and from valve chamber 18 through pipe 20 to the auxiliary reservoir 7, thus charging the auxiliary reservoir 7, and the valve chamber 18.

Fluid also flows from the pipe 20, through passage 34 to the piston chamber 33 of the quick service valve device 10. Since the diaphragm chamber 42 is connected to the passage 34 by passage 47, fluid also flows to the chamber 42. Fluid also flows to the serial release reservoir 11 from passage 34, through passage 48, past ball check valve 49, passage 50, and pipe 51. From passage 50, fluid flows past ball check valve 52 and through passage 53, to the annular chamber 45.

It will thus be noted that when the piston 14 of the triple valve device 8 is in release position, and the auxiliary reservoir 7 is charged with fluid under pressure, piston chamber 33, and diaphragm chambers 42 and 45 of the quick service valve device 10, and the serial release reservoir 11, are also charged with fluid under pressure, as supplied through the auxiliary reservoir pipe 20.

The valve chamber 36 of the quick service valve device 10 is charged with fluid under pressure from the brake pipe 6, through passage 37. Therefore, with the chambers 33 and 36 both charged with fluid under pressure in the manner described above, the piston 35 is held in release position by the spring stops 39 and 40.

With the triple valve device 8 in release position, the brake cylinder 9 is connected to the atmosphere, through pipe and passage 32, cavity 54 in the slide valve 16, and passage 55.

With the quick service valve device 10 in release position, chamber 46 above the diaphragm 41 is connected to atmosphere, through passage 56, cavity 57 in the slide valve 38, and passage 58.

Associated with the quick service valve device 10, is a reduction reservoir 59 which is connected to atmosphere, when the equipment is in release position, through pipe and passage 60, valve cavity 57, and passage 58, passage 60 being provided with a restriction or choke 74.

When it is desired to effect a service application of the brakes, the brake pipe pressure is gradually reduced in the usual manner. When the brake pipe pressure has been sufficiently reduced in piston chamber 12 of the triple valve device 8 below that in valve chamber 18 on the other side of piston 14, the higher pressure on the auxiliary reservoir side of the piston 14 is able to overcome the friction of said piston and its attached auxiliary slide valve 17 and move these parts to the left until the shoulder 61 on the end of the piston stem strikes against the right hand end of the main slide valve 16. In this position, the auxiliary slide valve 17 opens the port 62 in the slide valve 16.

In this initial movement, the feed groove 19 is closed, so that back flow from the auxiliary reservoir to the brake pipe is prevented.

Further movement of the piston 14 causes the movement of the main slide valve 16, but this movement requires a sufficient differential of pressures between the auxiliary reservoir and the brake pipe to overcome the frictional resistance of the main slide valve to movement.

The reduction in brake pipe pressure is also effective on the quick service valve device 10, and as soon as the pressure in valve chamber 36 has been sufficiently reduced below that in piston chamber 33 on the other side of the piston 35, the higher pressure on the auxiliary reservoir side of said piston is able to overcome the resistance of the spring stop 40 and move the piston 35 and slide valve 38 to the right. The movement of the slide valve 38 first closes the connection between the reduction reservoir 59 and the atmosphere, through passage 60 and the valve cavity 57, and then uncovers the passage 60, so that the valve chamber 36 is connected with the reduction reservoir 59. Fluid under pressure then flows from the brake pipe 6, through valve chamber 36, to the reduction reservoir 59, causing a quick local reduction in the brake pipe 6 and in the piston chamber 12.

The area of piston 35 being greater than that of the triple piston 14, and the frictional resistance of the small slide valve 38 being less than that of the main slide valve 16, the piston 35 will move upon a reduction in brake pipe pressure in advance of the movement of the main slide valve 16, for although the light spring 40 acts to prevent movement until the brake pipe pressure has been reduced a definite predetermined amount, the required amount of reduction is light, and just sufficient to ensure that the piston 35 will not move when not desired, due to unavoidable fluctuations in brake pipe pressure, in other words, the spring 40 acts to stabilize the operation of the quick service valve device.

It should here be noted that the volume of the reduction reservoir 59 is relatively large, so that the venting of fluid from the brake pipe to the reservoir takes place at a greater rate and for a longer time before the brake pipe equalizes with the pressure in the reservoir. With a small reservoir, the tendency is to equalize quickly with the brake pipe. A large reservoir can be used with the present equipment, because this reservoir is not used for the purpose of limiting the amount of reduction in brake pipe pressure except under certain conditions to be hereinafter explained.

It should also be noted that the flow area past the choke 74 in passage 60, is relatively large, so that a relatively rapid rate of flow of fluid from the brake pipe to the reservoir is obtained. A large port can be used with my invention, since the degree of local reduction in brake pipe pressure is normally determined by the movement of the triple valve piston to lap position. Furthermore, the quick service port can be made larger than with the existing bulb type quick service devices, because the transmission time is so short that difficulty is not experienced from the surging of fluid in the brake pipe.

Due to the action of the quick service valve device 10 above described, the brake pipe pressure in piston chamber 12 of the triple valve device 8 is quickly reduced, so that the higher pressure on the auxiliary reservoir side of piston 14 is able to overcome the resistance of the main slide valve 16, and the movement of the piston 14 and slide valve 16 to the left is assured.

The movement of the main slide valve 16 closes the connection between the passage 32 and the cavity 54 which is connected with the exhaust port through passage 55, and brings uncovered port 62 into partial registration with passage 32. Fluid under pressure then flows from the auxiliary reservoir 7 to the brake cylinder 9, through port 62 and passage and pipe 32.

At the same time, the first movement of the auxiliary slide valve 17, connects two ports 63 and 64 in the main slide valve 16, through cavity 65 in the auxiliary slide valve 17, and the movement of the main slide valve 16 brings port 63 to register with port 66 in the slide valve seat, and port 64 with port 67. Consequently, the fluid in chamber 27 flows through ports 66, 63, 65, 64 and 67, thence around the quick action piston 24, which fits loosely in its cylinder, to chamber 31 and to the brake cylinder.

When the pressure in chamber 27 has reduced below the brake pipe pressure remaining in chamber 68, the check valve 28 is raised and allows brake pipe fluid to flow past the check valve and through the ports 66, 63, 65, 64 and 67 to the brake cylinder. The size of these ports is so proportioned that the flow of fluid from the brake pipe to the top of the quick action piston 26, is not sufficient to force the piston 26 downward and thus cause an emergency application.

Since the piston chamber 33 of the quick service valve device 10 is connected to the auxiliary reservoir 7, the pressure of the fluid in said chamber reduces as the fluid flows from the auxiliary reservoir to the brake cylinder in applying the brakes.

When the reduction of the pressure of the fluid in piston chamber 33 approaches equalization with the reduced brake pipe pressure in valve chamber 36, on the opposite side of the piston 35, the spring stop 40 moves the piston 35 and the slide valve 38 to the left toward release position.

The movement of the slide valve 38 first laps the passage 60, thereby closing the connection between the reduction limiting reservoir 59 and the brake pipe and then connects the passage 60, through valve cavity 57, with the atmospheric passage 58, so that the fluid in the reduction limiting reservoir 59 is vented to the atmosphere.

It should be noted that the quick service valve device 10 returns to release position just prior to the triple valve assuming service lap position. As the reduction in brake pipe pressure proceeds, the quick service valve device 10 again takes up its quick service venting position and remains in this position approximately until the triple valve device, after having moved to service position, returns again to service lap position. It will be noted, therefore, that the quick service valve device 10 functions not only to propagate a brake application throughout the train with great rapidity but also to vent brake pipe locally throughout the train, thus reducing the quantity of fluid to be discharged at the engineer's brake valve, and insuring that effective braking action will be obtained throughout the train quickly and uniformly.

Further, it will be observed that the quick service valve device 10 provides for a variation in the quantity of fluid discharged from the brake pipe locally throughout the train. As the first reduction in brake pipe pressure passes through the train, the quick service valve device 10 remains in quick service venting position for a length of time proportional to the time required to move the triple valve device to its service position, this time, in turn, being proportional to the differential required to cause movement of the triple piston and main slide valve. As the brake pipe reduction proceeds, however, the quick service valve device 10 remains in its quick service venting position only for a time proportional to the differential required to move the triple piston and its auxiliary slide valve 17, which is always a lesser differential.

It is thus evident that my invention provides for a venting of brake pipe pressure on each car in a quantity sufficient to cause the triple valve device on that car to move to its service position. That is, the initial quick service venting is of variable quantity but controlled in every case by the reduction in brake pipe pressure necessary to cause the triple valve device to apply the brakes. The quick service venting, which continues as the reduction proceeds, is of lesser amount than the initial venting, but is still of variable quantity, as established by the differential required to move the triple piston and its auxiliary slide valve 17.

My invention therefore has the very desirable characteristic that the initial quick service venting, providing for the prompt movement of all triple valve devices to service position, is of greater amount than the successive quick service venting which bring about the well known graduating on of the brakes.

If the triple valve device fails to move to service lap position for any reason, the reduction limiting reservoir 59 prevents the quick service venting increasing to such an amount as to interfere with proper brake action.

Another characteristic of my invention which is novel is that because the initial quick service continues until the triple valve device has applied the brakes, it is possible to apply all brakes in the train with a light reduction on the engine even though the initial brake pipe pressure on the rear of the train may be materially lower than that on the head end.

The quick service venting of fluid from the brake pipe to the brake cylinder, due to the movement of the triple valve parts to service application position, in the manner hereinbefore described, supplements the initial quick service venting due to operation of the quick service valve device, so that the total venting of fluid from the brake pipe by operation of the quick service valve device and by operation of the triple valve device will provide the desired degree of brake pipe reduction.

Due to the larger sized piston and the small slide valve 38, the quick service valve device 10 operates on a lesser differential of pressures than is required to operate the triple valve device 8 to effect a service application of the brakes. The operation of the quick service valve device thus hastens the operation of the local triple valve device, and also hastens the operation of the quick service valve device on the car following, so that a quick serial reduction in brake pipe pressure is propagated throughout the train.

Fluid continues to flow from the auxiliary reservoir 7 through port 62 and passage 32 to the brake cylinder 9, until the pressure in the valve chamber 18 becomes enough less than that of the brake pipe to cause piston 14 and auxiliary slide valve 17 to move to the right until the shoulder 72 on the piston stem strikes the left hand end of the main slide valve 16.

As the friction of the piston 14 and auxiliary slide valve 17 is much less than that of the main slide valve 16, the difference in pressure which will move the piston and auxiliary slide valve, will not be sufficient to also move the main slide valve, consequently, the piston stops in the position in which the auxiliary slide valve 17 blanks the port 62, thus cutting off any further flow of fluid from the auxiliary reservoir to the brake cylinder. In this position, the auxiliary slide valve 17 also blanks the port 63, thus preventing further flow of fluid from the brake pipe through the quick service ports. Consequently, no further change in fluid pressure can occur, since all ports are lapped.

If it is desired to make a heavier application, a further reduction in brake pipe pressure by manipulation of the engineer's brake valve is made, and then the operation of the valve devices described above repeated, until the auxiliary reservoir and brake cylinder pressures become equalized.

When it is desired to release the brakes, the brake pipe pressure is increased in the usual way by moving the engineer's brake valve to full release position, which consequently increases the pressure of fluid in piston chamber 12 of the triple valve device 8 and in valve chamber 36 of the quick service valve device 10, so that the piston 14 is moved to the right toward its release position, while the piston 35 is moved toward the left.

The spring 39 is of such value that normally a greater differential on piston 35 is required to compress spring 39 than is needed to move piston 14 in the triple valve device to release position. In the ordinary case, therefore, piston 14 moves to release while piston 35 remains in its normal or running position. If, however, the increase in brake pipe pressure is sufficiently rapid, as is the case at the head end of the train, the differential on piston 35 is further increased because the feed groove 19 does not permit a sufficient flow of fluid to allow the pressure in the auxiliary reservoir 7 to increase at the same rate as brake pipe pressure increases in chamber 12. Consequently, piston 14 is forced further to the right compressing spring 22 and causing the triple valve device to take up the well known retarded release position.

When the increase in brake pipe pressure is sufficiently rapid to build up a differential on piston 14 causing it to move to retarded release position, it is obvious that spring 39 in the quick release mechanism 10 can be given such a value that under these circumstances, piston 35, which is subject to the same differential, will move to the left, compressing spring 39. Fluid from the serial release reservoir 11 is then permitted to flow to the brake pipe as will now be described.

When the piston 35 is moved to the left so as to compress the spring 39, the slide valve 38 is moved to a position in which passage 56 is opened to the valve chamber 36. Fluid under pressure from valve chamber 36 and the brake pipe then flows through passage 56 to chamber 46 which is open to the inner seated area formed by the seat rib 44.

With release reservoir pressure in chamber 45, brake pipe pressure in chamber 46, and auxiliary reservoir pressure in chamber 42, the diaphragm 41 will be moved away from its engagement with seat rib 44, compressing the spring 43, since auxiliary reservoir pressure in chamber 42 will be lower than the brake pipe pressure, when the brakes are being released.

The movement of the diaphragm 41 away from the seat rib 44 connects the chambers 45 and 46, and the serial release reservoir 11 is connected to the brake pipe 6 by way of passage 50, past check valve 52, passage 53, chamber 45, chamber 46, through passage 69, past ball check valve 70, and passages 71 and 37, so that sudden increase in brake pipe pressure is produced.

When the auxiliary reservoir pressure is built up to a sufficient degree, the spring stop 39 returns the piston 35 and the slide valve 38 of the quick service valve device 10 to release position.

If rate of increase in brake pipe pressure initiated by the brake valve device is sufficient to shift the triple valve devices adjacent to the engine to retarded release position, the piston 14 of the triple valve devices at the head end of the train will be shifted to its retarded release position, the piston stem operating to compress the retarded release spring 22, through engagement with the stop member 21.

In the retarded release position, cavity 54 in the main slide valve 16 registers with brake cylinder passage 32, while a passage 73 having a restricted flow capacity registers with atmospheric exhaust port 55. Fluid under pressure is therefore released from the brake cylinder at a restricted slow rate.

The movement of the piston 35 to the left so as to compress the spring 39 on cars adjacent to the engine, causes a local increase in brake pipe pressure which is transmitted to cars at the rear of the cars adjacent to the engine, so that the rate of increase in brake pipe pressure is sufficient to cause the triple valve devices to successively move to the retarded release position throughout the train, the pistons 35 of the quick service valve devices on the successive cars being moved to the quick serial release position, so as to vent fluid from the release reservoir 11 on each car to the brake pipe.

The release of the brakes throughout the train is thus accelerated, so that the release is more nearly simultaneous, thus avoiding severe shocks and possible danger of a break-in-two due to the running out of the slack.

Since the rate of increase in brake pipe pressure required to move the piston 35 to its quick release position corresponds with that necessary to effect the movement of the triple valve device to retarded release position, it will be seen that a slow rate of increase in brake pipe pressure will not be effective to cause quick serial release. Consequently, the movement of a triple valve device to release position, due to leakage of fluid from the auxiliary reservoir will not normally initiate quick serial release, nor will random surges in brake pipe pressure occurring during a reduction in brake pipe pressure cause the quick serial release mechanism to act for the same reasons.

It also results that if one of the quick serial release mechanisms should act, it will not cause the tripping of other quick serial mechanisms, except in case the brake valve device is positioned so as to feed fluid under pressure to the brake pipe at the rapid release rate.

The triple valve devices having been shifted to retarded release position, the release of fluid from the brake cylinder is at such a slow rate that the release on the head cars of the train and in fact throughout the train is slow enough to ensure that the brakes will be released without causing shocks or a break-in-two.

With the brake valve device in lap position, leakage from the release reservoir 11 to the brake pipe cannot occur, since leakage from the chamber 45, which is connected to the release reservoir through passage 53, past the seat rib 44, will be vented to the atmosphere, by way of cavity 57 in slide valve 38 and exhaust port 58. Leakage from the release reservoir 11, past the check valve 49 will pass to the auxiliary reservoir, since passage 48 is connected to the auxiliary reservoir.

The venting of fluid from the serial release reservoir 11 to the brake pipe on the head cars of the train augments the increase in brake pipe pressure due to fluid inflow through the engineer's brake valve, and consequently causes successive serial release mechanisms to vent fluid from the serial release reservoir 11 into the brake pipe, so that all brakes in the train are quickly released. That is to say, the movement of the engineer's brake valve to release position inaugurates serial release action on the front portion of the train after which it perpetuates itself throughout the train.

One limitation of serial release mechanisms heretofore proposed has been the danger of one triple valve device moving unintentionally from lap to release position and by so doing starting serial release activity and thereby completely releasing all brakes throughout the train. Such unintentional release could be brought about by leakage from auxiliary reservoir 7 during the time the brakes were being held applied. With my invention such a limitation has been removed. In the ordinary case, if the triple valve device assumes release position due to the differential built up on piston 14 by leakage from the auxiliary reservoir 7, the same differential existing on piston 35 in the serial release mechanism is of insufficient amount to compress spring 39. If for any reason, such as the presence of excessive dirt, the differential on piston 14 required for its movement is less than that required for movement of piston 35 and under this abnormal condition, leakage from the auxiliary reservoir 7 also develops, which is likewise abnormal, then piston 35 will move to the left, compressing spring 39 and permitting fluid from serial release reservoir 11 to flow into the brake pipe.

Such an inflow will increase the brake pipe pressure on adjacent cars but at a relatively slow rate. Because piston 14 normally moves on less differential than piston 35, the triple valve devices on adjacent cars will assume release position whereby feed groove 19 is opened. The slight increase in brake pipe pressure is therefore dissipated by discharge into the auxiliary reservoirs, so that further serial release activity is prevented. It is obvious, therefore, that the limitation of one triple valve device inaugurating complete serial release has been overcome by the use of a separate serial release mechanism whereby the triple valve devices are permitted to go to release position without causing any action on the part of the serial release mechanism and by so doing permitting the discharge of slow increases of brake pipe pressure into the auxiliary reservoirs, thereby reducing the differential tending to cause piston 35 to move and also by giving spring 39 in the serial release mechanism such a value that the triple valve device normally moves to release position in advance of the movement of the serial release mechanism to serial release position.

Another purpose in fixing the value of spring 39 in the serial release mechanism so that a greater differential is required to move piston 35 to the left than is required to move piston 14 in the triple valve device to the right into its release position is that random waves exist in the brake pipe during a brake pipe reduction. These random waves or surges would cause the serial release mechanisms to move to serial release position if it were not that spring 39 has been given such a value as to make the serial release mechanism stable against such random waves.

Another limitation heretofore existing with serial release mechanisms has been the likelihood of leakage from the serial release reservoir passing into the brake pipe, while the triple valve devices were in lap position, increasing the brake pipe pressure and so releasing the brakes when not intended. My invention overcomes this limitation by providing that any leakage from the release reservoir passes either to the atmosphere from which no improper functioning can come or into the auxiliary reservoir 7, the effect of which is to still further apply the brakes instead of releasing them.

It will be observed that the differential to move piston 35 in the serial release mechanism will remain substantially unchanged even in the presence of dirt, etc., because the differential is fixed almost entirely by the value of spring 39, since the resistance of the slide valve 38 is negligible when compared to the large area of piston 35.

It will likewise be observed that the valve means for permitting fluid from the release reservoir 11 to pass to the brake pipe is of novel construction which permits a prompt flow of fluid through comparatively large passages which is essential to the proper propagation of serial release activity throughout the train.

The construction of the quick service valve device is such that if the brake pipe pressure varies at less than a service rate, the feed groove of the triple valve device will maintain the brake pipe and auxiliary reservoir pressures substantially in balance, so that no differential of pressures is set up on the piston 35. If the brake pipe pressure is reduced at a service rate, the piston 35 will promptly move, and the first movement will cause the small slide valve 38 to move and open a relatively large port for venting fluid from the brake pipe to a relatively large reservoir, so that a quick and effective venting of fluid from the brake pipe takes place, which is rapidly propagated throughout the train.

The quick service venting continues so long as the triple valve device remains in service application position, since the lapping of the quick service valve device depends upon the substantial equalization of the auxiliary reservoir and brake pipe pressures.

The quick service venting by the quick service valve device is also effective in making an emergency application of the brakes, and therefore serves to accelerate quick action in emergency applications.

According to my invention, a valve device separate from the triple valve device and subject to the opposing pressures of the brake pipe and auxiliary reservoir is provided for controlling the venting of fluid under pressure from the brake pipe so as to secure quick serial action in effecting a service application of the brakes, so that quick service action will be positively obtained upon a light but predetermined reduction in brake pipe pressure.

According to another feature of my invention, the separate quick service controlling valve device also functions to accelerate the release of the brakes by operating to vent fluid from a normally charged release reservoir to the brake pipe, when the brake pipe pressure is increased to effect the release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe, auxiliary reservoir, brake cylinder, and a triple valve device operated upon a reduction in brake pipe pressure for supplying fluid from the auxiliary reservoir to the brake cylinder, of a reduction reservoir, and a valve device subject to the opposing pressures of the auxiliary reservoir and brake pipe and having one position in which fluid is vented from the brake pipe to the reduction reservoir and another position in which fluid is vented from the reduction reservoir to the auxiliary reservoir and movable upon a reduction in brake pipe pressure to the position for venting fluid from the brake pipe to said reservoir and movable upon a subsequent reduction in auxiliary reservoir pressure to the position for venting fluid from the reduction reservoir to the atmosphere.

2. In a fluid pressure brake equipment, the combination with a brake pipe, auxiliary reservoir, brake cylinder, and a triple valve device operated upon a reduction in brake pipe pressure for supplying fluid from the auxiliary reservoir to the brake cylinder, of a reduction reservoir, a spring, and a valve device subject to auxiliary reservoir pressure opposed by brake pipe pressure and the pressure of said spring and operated by a predetermined reduction in brake pipe pressure to vent fluid from the brake pipe to said reduction reservoir, said spring moving said valve device to a position for venting fluid from the reduction reservoir to the atmosphere, when the auxiliary reservoir pressure is reduced substantially to the reduced pressure in the brake pipe.

3. In a fluid pressure brake, the combination with a brake pipe, auxiliary reservoir, brake cylinder, and a triple valve device operated upon a reduction in brake pipe pressure for venting fluid from the auxiliary reservoir to the brake cylinder, of a release reservoir, a valve device subject to the opposing pressures of the brake pipe and auxiliary reservoir and operated upon a predetermined increase in brake pipe pressure for supplying fluid from said release reservoir to the brake pipe, and valve means subject to the opposing pressures of the auxiliary reservoir and the release reservoir for controlling communication through which fluid is supplied from the release reservoir to the brake pipe.

4. In a fluid pressure brake, the combination with a brake pipe, auxiliary reservoir, brake cylinder, and a triple valve device operated upon a reduction in brake pipe pressure for venting fluid from the auxiliary reservoir to the brake cylinder, of a release reservoir, valve means subject on one side to auxiliary reservoir pressure and on the opposite side to pressure of said release reservoir and the pressure in a chamber, for controlling communication from said release reservoir to said chamber, and a valve device subject to the opposing pressures of the auxiliary reservoir and the brake pipe and operated upon a predetermined increase in brake pipe pressure for connecting said chamber to the brake pipe.

5. In a fluid pressure brake, the combination with a brake pipe, auxiliary reservoir, brake cylinder, and a triple valve device operated upon a reduction in brake pipe pressure for venting fluid from the auxiliary reservoir to the brake cylinder, of a release reservoir, valve means subject on one side to auxiliary reservoir pressure and on the opposite side to release reservoir pressure and the pressure of a chamber for controlling communication from said release reservoir to said chamber, a valve device subject to the opposing pressures of the auxiliary reservoir and the brake pipe and operated upon a predetermined increase in brake pipe pressure for connecting said chamber to the brake pipe, and a spring for opposing movement of said valve device to connect said chamber with the brake pipe.

6. In a fluid pressure brake, the combination with a brake pipe, auxiliary reservoir, brake cylinder, and a triple valve device operated upon a reduction in brake pipe pressure for venting fluid from the auxiliary reservoir to the brake cylinder, of a release reservoir, valve means subject on one side to auxiliary reservoir pressure and on the opposite side to release reservoir pressure and the pressure of a chamber, for controlling communication from said release reservoir to said chamber, a valve device subject to the opposing pressures of the auxiliary reservoir and the brake pipe and normally connecting said chamber to the atmosphere and operated upon a predetermined increase in brake pipe pressure for connecting said chamber to the brake pipe.

7. In a fluid pressure brake, the combination with a brake pipe, auxiliary reservoir, brake cylinder, and a triple valve device operated upon a reduction in brake pipe pressure for venting fluid from the auxiliary reservoir to the brake cylinder, of a release reservoir, valve means subject on one side to auxiliary reservoir pressure and on the opposite side to release reservoir pressure and the pressure of a chamber, for controlling communication from said release reservoir to said chamber, a valve device subject to the opposing pressures of the auxiliary reservoir and the brake pipe and normally connecting said chamber to the atmosphere and operated upon an increase in brake pipe pressure for connecting said chamber to the brake pipe, and a spring for opposing movement of said valve device to connect said chamber with the brake pipe.

8. In a fluid pressure brake, the combination with a brake pipe, auxiliary reservoir, brake cylinder, and a triple valve device operated upon a reduction in brake pipe pressure for supplying fluid from the auxiliary reservoir to the brake cylinder and operated upon a predetermined rate of increase in brake pipe pressure for retarding the release of fluid from the brake cylinder, of a release reservoir and a valve device subject to the opposing pressures of the auxiliary reservoir and the brake pipe and operated only by an increase in brake pipe pressure sufficient to move the triple valve device to retarded release position for venting fluid from the release reservoir to the brake pipe.

9. In a fluid pressure brake, the combination with a brake pipe, auxiliary reservoir, brake cylinder, and a triple valve device operated upon a reduction in brake pipe pressure for supplying fluid from the auxiliary reservoir to the brake cylinder and operated upon a predetermined rate of increase in brake pipe pressure for retarding the release of fluid from the brake cylinder, of a release reservoir, a valve device subject to the opposing pressures of the auxiliary reservoir and the brake pipe and operated upon an increase in brake pipe pressure for venting fluid from the release reservoir to the brake pipe, and a spring for opposing movement of said valve device to the position for venting fluid from the release reservoir to the brake pipe, and adapted to permit said movement only when the increase in brake pipe pressure is sufficient to cause movement of the triple valve device to its retarded release position.

10. In a fluid pressure brake, the combination with a brake pipe, and a triple valve device, of a reduction reservoir, a release reservoir, and means operated upon a reduction in brake pipe pressure for venting fluid from the brake pipe to the reduction reservoir and operated upon an increase in brake pipe pressure for venting fluid from the release reservoir to the brake pipe and for venting fluid from the reduction reservoir to the atmosphere.

11. In a fluid pressure brake, the combination with a brake pipe, of a release reservoir normally charged with fluid under pressure, a valve device operated upon an increase in brake pipe pressure for venting fluid from said reservoir to the brake pipe, and means associated with said valve device for normally venting fluid leaking from said reservoir to the atmosphere.

12. In a fluid pressure brake, the combination with a brake pipe, of a release reservoir normally charged with fluid under pressure, a valve device operated upon an increase in brake pipe pressure for venting fluid from said reservoir to the brake pipe, valve means for controlling communication through which said valve device vents fluid from the reservoir to the brake pipe, and means associated with said valve device for normally venting leakage of fluid from said reservoir past said valve means to the atmosphere.

JOSEPH C. McCUNE.